(12) United States Patent
Mayer et al.

(10) Patent No.: US 9,464,753 B2
(45) Date of Patent: Oct. 11, 2016

(54) TRIPOD BOWL CLAMP DEVICE

(71) Applicant: Vitec Videocom GMBH, Eching (DE)

(72) Inventors: Franz Mayer, Anzing (DE); Leonhard Jaumann, München (DE)

(73) Assignee: Vitec Videocom GMBH, Eching (DE)

( * ) Notice: Subject to any disclaimer, the term of this patent is extended or adjusted under 35 U.S.C. 154(b) by 0 days.

(21) Appl. No.: 14/781,878

(22) PCT Filed: Mar. 31, 2014

(86) PCT No.: PCT/EP2014/056470
§ 371 (c)(1),
(2) Date: Oct. 1, 2015

(87) PCT Pub. No.: WO2014/161822
PCT Pub. Date: Oct. 9, 2014

(65) Prior Publication Data
US 2016/0040824 A1 Feb. 11, 2016

(30) Foreign Application Priority Data
Apr. 2, 2013 (EP) .................................... 13162027

(51) Int. Cl.
| | |
|---|---|
| *F16M 11/12* | (2006.01) |
| *H04N 5/225* | (2006.01) |
| *F16M 11/24* | (2006.01) |
| *F16B 2/18* | (2006.01) |
| *F16C 11/10* | (2006.01) |
| *G03B 17/56* | (2006.01) |

(52) U.S. Cl.
CPC ............. *F16M 11/126* (2013.01); *F16B 2/185* (2013.01); *F16C 11/103* (2013.01); *F16M 11/242* (2013.01); *G03B 17/561* (2013.01); *H04N 5/2251* (2013.01)

(58) Field of Classification Search
CPC ... F16M 11/126; F16M 11/242; F16B 2/185; F16C 11/103; G03B 17/561; H04N 5/2251
See application file for complete search history.

(56) References Cited

U.S. PATENT DOCUMENTS

| 3,632,073 A | 1/1972 | Nakatani | |
|---|---|---|---|
| 4,579,436 A * | 4/1986 | Jaumann | F16M 11/16 248/163.1 |

(Continued)

FOREIGN PATENT DOCUMENTS

| WO | WO 03083351 A1 | 10/2003 |
|---|---|---|
| WO | WO2010/108821 A1 | 9/2010 |

*Primary Examiner* — Nicholas Giles
(74) *Attorney, Agent, or Firm* — Pepper Hamilton LLP

(57) ABSTRACT

A camera support bowl clamp device comprises a bowl member of a pan tilt head suitable for supporting a broadcast or motion picture camera arranged within a recessed member of a camera support, whereby said bowl member is attached at one end of a shaft and a clamping cup arranged at an opposite end of said shaft, whereby said opposite end extends through said recessed member of a camera support; wherein said clamping cup located at a first limit position applies a clamping force to a surface of said recessed member of a camera support which subsequently pulls said bowl member, via said shaft, down into said recess and applies a second clamping force from a surface of said bowl to a cooperating surface of said recessed member, and at a second limit position releases said clamping force to said recessed member which subsequently releases said second clamping force by separating said surface of said bowl from said cooperating surface of said recessed member; characterized in that said clamping cup further comprises a clamp adjustment member, a resilient member, and a lever pivotally attached to said clamp adjustment member whereby the movement of said lever to a first position compresses said resilient member to locate said clamping cup at said second limit position, and at a second position said lever allows the resilient member to decompress to locate said clamping cup at said first position.

12 Claims, 3 Drawing Sheets

(56) References Cited

U.S. PATENT DOCUMENTS

| | | | |
|---|---|---|---|
| 5,957,445 A | 9/1999 | Hagman et al. | |
| 6,151,787 A * | 11/2000 | Wright | G01C 15/008 33/286 |
| 7,111,424 B1 | 9/2006 | Moody et al. | |
| 8,025,262 B2 * | 9/2011 | Yamaguchi | F16M 11/04 248/176.1 |
| 2008/0156947 A1 * | 7/2008 | Yamaguchi | F16M 11/04 248/177.1 |

\* cited by examiner

TRIPOD BOWL CLAMP DEVICE

CROSS REFERENCE TO RELATED APPLICATIONS

This application is a National Phase of PCT Patent Application No. PCT/EP2014/056470 filed Mar. 31, 2014, which claims priority to European Application No. 13162027.0 filed Apr. 2, 2013 the contents of which are incorporated herein by reference in its entirety.

FIELD OF THE INVENTION

The invention relates to a tripod bowl clamp device, in particular to a bowl clamp device for a camera tripod which supports a camera mounted on a pan and tilt head.

CURRENT STATE OF ART

It is well known in the broadcast and film industry for cameras to be mounted on a pan and tilt head and this head in turn to be mounted on a tripod. In this case the pan and tilt head needs to levelled to compensate for the top of the tripod not being set up level once levelled the pan and tilt head must then be clamped firmly to the tripod so that the base of the pan and tilt head cannot move relative to the tripod. Typically this is achieved by having a bowl on the base of the head that sits in a conical cup on the top of the tripod. Typically a threaded shaft extends out of the bottom of the bowl and a clamp knob is then provided, which can be moved up and down the threaded shaft by means of the thread. The bowl clamp knob has a cup on the top incorporating a taper designed to engage with a spherical face on the underside of the top of the tripod. This curved face shares the same centre as that of the curved face on the bowl on the base of the head.

With the bowl clamp knob is fully tightened, the cup on the top of the bowl clamp is pressed into the spherical face on the underside of the top of the tripod and the bowl on the base of the head is pulled down into the conical cup on the top of the tripod providing a frictional force to prevent movement between the pan and tilt head and the top of the tripod.

When the bowl clamp knob is released, the frictional force between the bowl on the base of the pan and tilt head and the conical cup on the top of the tripod is reduced. This allows the head to move in three rotational degrees of freedom relative to the top of the tripod and so be levelled.

SUMMARY OF THE INVENTION

In a broad independent aspect, the invention provides a camera support bowl clamp device comprising a bowl member of a pan tilt head suitable for supporting a broadcast or motion picture camera arranged within a recessed member of a camera support, whereby said bowl member is attached at one end of a shaft and a clamping cup arranged at an opposite end of said shaft, whereby said opposite end extends through said recessed member of a camera support; wherein said clamping cup located at a first limit position applies a clamping force to a surface of said recessed member of a camera support which subsequently pulls said bowl member, via said shaft, down into said recess and applies a second clamping force from a surface of said bowl to a cooperating surface of said recessed member, and at a second limit position releases said clamping force to said recessed member which subsequently releases said second clamping force by separating said surface of said bowl from said cooperating surface of said recessed member; characterised in that said clamping cup further comprises a clamp adjustment member, a resilient member, and a lever pivotally attached to said clamp adjustment member whereby the movement of said lever to a first position compresses said resilient member to locate said clamping cup at said second limit position, and at a second position said lever allows the resilient member to decompress to locate said clamping cup at said first position.

This configuration provides the advantage of providing the tripod user with a quick and easy means of adjusting the position of the camera, which is supported by a pan and tilt head located on top of the tripod. When the user operates the lever it releases the clamping force of the bowl clamp which enables the adjustment of the supporting bowl within the cup member of the tripod. This eliminates the requirement for the user to manually reach up to the movement limiting member, which is located underneath the head of the tripod, and having to rotate the limiting member manually by hand, which can be troublesome and awkward due to the placement of the tripod's legs about the head, which can cause injury to the user hand(s) or Arm(s) if the tripod collapses. Furthermore, prolonged use by the user can cause injury due to the awkward rotation of the movement limiting member.

Preferably, said resilient member is a plurality of annular disc springs located about said movement limiting member.

This configuration provides the advantage of applying an even pressure to the bottom surface of the second cup member which, in use, displaces the second cup member in an upward direction so that it provides an even engagement with the curved lower surface of the cup member of the tripod.

Preferably, said clamp adjustment member further comprises a smooth outer surface which cooperates with an aperture of each said disc spring.

This configuration provides the advantage of enabling a smooth and uninhibited movement of the plurality of disc springs along the outer surface of the movement limiting member, when pressure is applied from the lever.

Preferably, said clamp adjustment member incorporates a flat face which cooperates with a slot within said lever.

This configuration provides the advantage of preventing the movement limiting member from rotating about the axis of the shaft relative to the lever.

Preferably, said clamp adjustment member is a nut which comprises a threaded aperture that cooperates with a threaded portion on said shaft that, in use, facilitates the positional adjustment of said nut on said shaft.

This configuration provides the advantage of providing the positional adjustment of the movement limiting member along the shaft.

Preferably, a positional adjustment of said nut along said shaft towards said bowl member elevates both said resilient means and said clamping cup towards said bowl member.

This enables the user to rotate the lever about the shaft and in turn rotate the movement limiting member about the shaft to adjust the clamping force of the bowl clamp.

Preferably, the rotational adjustment of said said clamp adjustment member by 'n' turns displaces said said clamp adjustment member by a 'np' amount, whereby 'p' is the pitch of said threaded aperture, which in use compresses said resilient member by said amount 'np' which subsequently forces said clamp cup into a surface of said bowl member with a force 'f' which is equal to 'knp', whereby 'k' is the spring rate of said resilient member.

The advantage of this configuration is that it provides equal and opposite reactions in which the bowl member is at the same time pulled down into the curved upper surface of the cup member arranged in the top face of the top of the tripod. Therefore creating enough friction between the bowl member and the cup member arranged in the top face of the top of the tripod to prevent the bowl member from rotating relative to the top of the tripod whilst the pan and tilt head is being used.

Preferably a bowl clamp device, further comprising a second lever pivotally attached to said said clamp adjustment member whereby the movement of said second lever to a first position compresses said resilient member to locate said clamp adjustment member at said second limit position, and at a second position said second lever decompresses said resilient member to locate said clamp adjustment member at said first limit position.

This configuration provides the advantage of providing an increased pressure that evenly compresses the resilient member located within the movement limiting member, which can be easily used by the user via the use of one hand.

Preferably a bowl clamp device, further comprising a second lever statically attached to said clamp adjustment member.

This configuration provides the advantage of providing the user with a stable grip for one hand whilst applying an increased pressure to one of the levers attached to the movement limiting member.

Preferably, said clamp adjustment member further comprises an elongate adjustment member which extends that extends along the same plane as said lever(s).

This configuration has the advantage of providing the user with a means of providing a rotational adjustment of the movement limiting member along the shaft which is more accessible to the user and therefore reduces the awkwardness of adjusting the clamping force of the bowl clamp.

Preferably, said clamp adjustment member further comprises a means of disengaging/engaging said thread from said shaft, which in use facilitates a rapid positional adjustment of said clamp adjustment member further along said shaft.

This configuration has the advantage of providing a quick release mechanism, which allows the rapid movement of the limiting member, whilst it is disengaged from the shaft. When the movement limiting member is engaged to the shaft, it allows the movement limiting member to be rotated so that it can moved along the shaft as normal.

Preferably, a tripod in accordance with any of the above features.

DETAILED DESCRIPTION OF THE FIGURES

Figure 1:
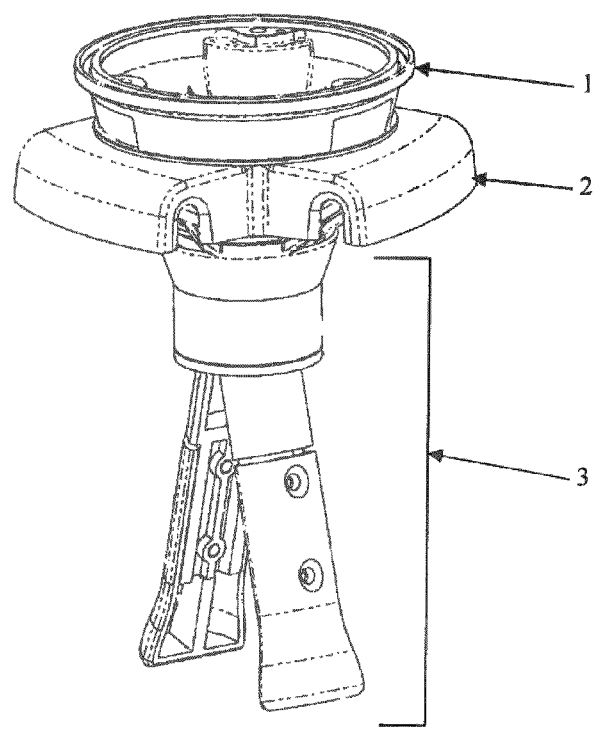
FIG. 1 shows a perspective view of the quick release clamp, tripod bowl, and pan and tilt head bowl with the quick release clamp in the locked position.
Figure 2:
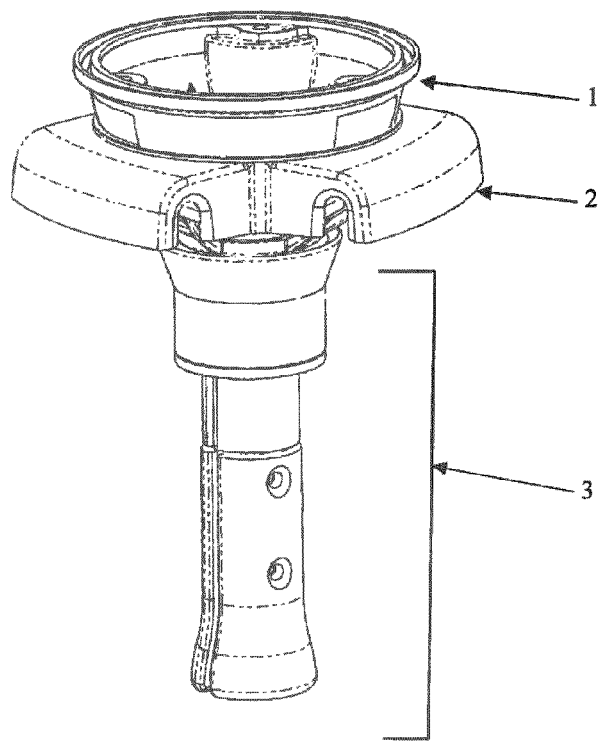
FIG. 2 shows a perspective view of the quick release clamp, tripod bowl, and pan and tilt head bowl with the quick release clamp in the released position.
Figure 3:
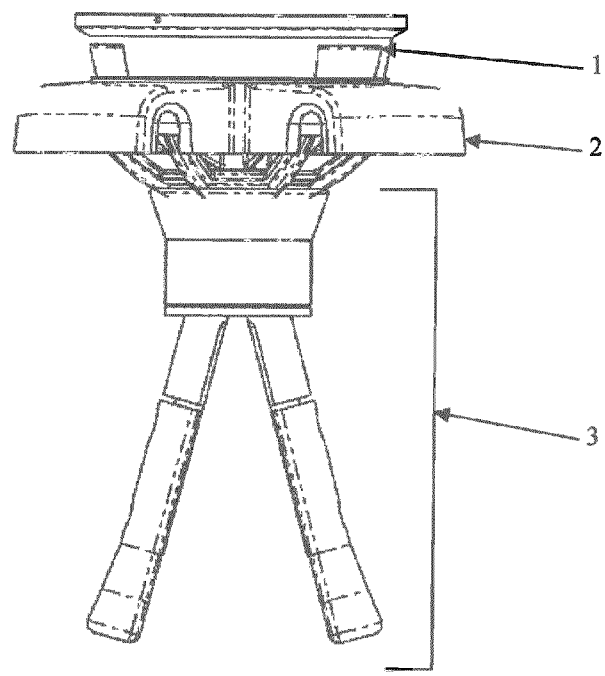
FIG. 3 shows a side view of the quick release clamp, tripod bowl, and pan and tilt head bowl with the quick release clamp in the locked position.
Figure 4:
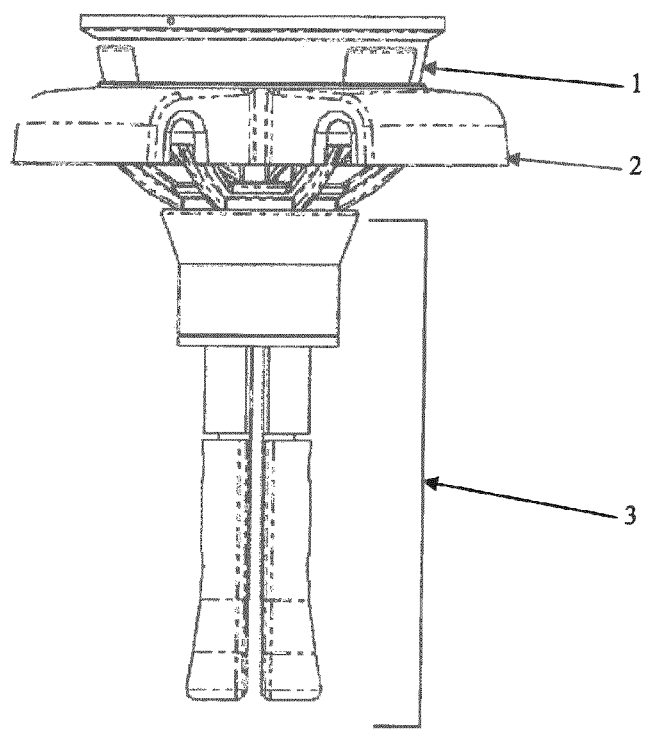
FIG. 4 shows a sectional view through the quick release clamp, tripod bowl and pan and tilt head bowl with the quick release clamp in the released position.
Figure 5:
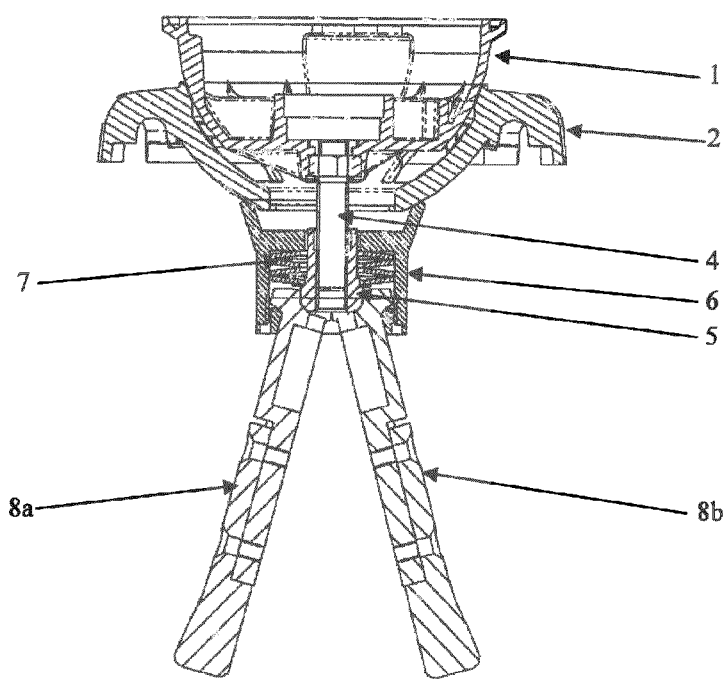
FIG. 5 shows a side view of the quick release clamp, tripod bowl, and pan and tilt head bowl with the quick release clamp in the released position.
Figure 6:
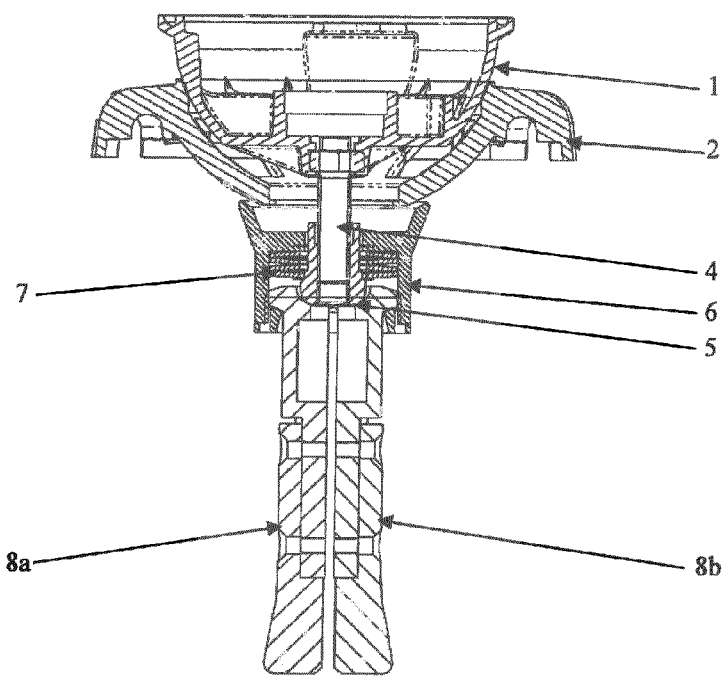
FIG. 6 shows a sectional view through the quick release clamp, tripod bowl, and pan and tilt head bowl with the quick release clamp in the locked position.

In the current invention a bowl (1) forms the base of a pan and tilt head. The top of a tripod (2) has a conical cup in its top face and a spherical face on its underside. The bowl (1) sits in the conical cup in the top face of the top of the tripod (2) allowing the orientation of the head to be adjusted.

A threaded shaft (4) is rigidly connected to the bowl (1). A bowl clamp nut (5) is screwed on to the threaded shaft (4). The bowl clamp nut (5) has a step in it so that a stack of disc springs (7) sit on top of. The bowl clamp nut (5) also has a plain shaft on its outer face that the disc springs (7) can run up and down. Sitting on top of the disc springs (7) and free to run up and down the plain shaft on the bowl clamp nut (5) is a bowl clamp cup (6). By rotating the bowl clamp nut (5) it moves up the threaded shaft (4) lifting the disc springs (7) and the bowl clamp cup (6). When the bowl clamp nut (5) is moved sufficiently far up the threaded shaft (4) the bowl clamp cup (6) is brought into contact with the spherical face on the underside of the top of the tripod (2). Continuing to rotate the nut (5) by n turns will cause bowl clamp nut to rise by an amount np {where p is the pitch of the thread on the bowl clamp nut (5)}. The disc springs (7) will therefore be compressed by an amount np and so the bowl clamp cup (6) will be forced into the spherical face on the underside of the top of the tripod (2) with a force F which is equal to knp {where k is the spring rate of the disc spring stack (7)}. Due to equal and opposite reactions the bowl (1) is at the same time pulled down into the conical cup in the top face of the top of the tripod (2) by a force F. By applying a sufficient number of turns to the bowl clamp nut (5) the user can increase the force F and so create enough friction between the bowl (1) and the conical cup in the top face of the top of the tripod (2) to prevent the bowl (1) from rotating relative to the top of the tripod (2) while the pan tilt head is being used.

A pair of bowl clamp levers (8) are provided that are pivotally connected to the bowl clamp nut (5). The levers (8) also push on a face of the bowl clamp cup (6). The disc springs (7) naturally push the bowl clamp cup (6) upwards relative to the bowl clamp nut (5) forcing the bowl clamp levers (8) to open. By squeezing the bowl clamp levers (8) together the bowl clamp cup (6) is pulled down and so the clamping force F is released. By releasing the clamping force F the friction between the bowl (1) and the conical cup in the top face of the top of the tripod (2) is reduced allowing the pan tilt head to be reoriented relative to the top of the tripod. The bowl clamp levers (8) can then be released and the disc springs (7) will then push the bowl clamp cup (6) upwards relative to the bowl clamp nut (5) and force it against the spherical face on the underside of the top of the tripod (2) with the same force F as before the bowl clamp levers (8) were squeezed together. Thus creating the same amount of friction between the bowl (1) and the conical cup in the top face of the top of the tripod (2) so as to prevent the bowl (1) from rotating relative to the top of the tripod (2) while the pan tilt head is being used.

The bowl clamp nut (5) has flat faces on it that engage with slots in the bowl clamp levers (8) to stop the bowl clamp nut (5) from rotating about the axis of the threaded shaft (4) relative to the bowl clamp levers (8). This allows the user to rotate the bowl clamp levers (8) about the threaded shaft (4) and in turn rotate the bowl clamp nut (5) about the threaded shaft (4) and so adjust the clamping force F.

In an alternative embodiment of the invention, the invention incorporates a single bowl clamp lever that moves relative to the head and another bowl clamp lever that remains static relative to the head.

In another alternative embodiment of the invention, you could make it so that the bowl clamp nut can rotate about the axis of the threaded shaft relative to the bowl clamp levers. An adjustment shaft could extend from the bowl clamp nut down to the bottom of the quick and easy bowl clamp (3). The user could then turn this adjustment shaft to rotate the bowl clamp nut moving it along the threaded shaft and so adjusting the compression on the disc springs and in turn adjust the clamping force F.

In another alternative embodiment of the invention, the bowl clamp nut could include a quick release mechanism to allow the bowl clamp nuts thread to be disengaged from the threaded shaft. The bowl clamp could then be quickly slid up or down the threaded shaft. The quick releases mechanism could then be disengaged locking the bowl clamp nuts thread on to the threaded shaft allowing the bowl clamp nut to be rotated and so moved along the threaded shaft as normal. This would make the bowl clamp quicker to fit to and remove from the head.

The Features of the Invention, according to the Applicant are set out as follows:

1. A bowl clamp device for use with a pan and tilt head that has a bowl on the underside, the bowl being designed to sit in a cup in a support, such as a tripod. The bowl clamp device being designed to fix to the pan and tilt head and provide a force to engage the bowl into the cup. The force being provided by springs and the clamp force being released by squeezing two or more levers together. Where both levers move.

2. As per paragraph 1 the bowl clamp device including a nut where the clamp force can be adjusted by rotating the nut about a threaded shaft in order to vary the compression of the springs.

3. As per paragraph 2 the bowl clamp device not allowing the nut to rotate about the axis of the threaded shaft relative to the levers so the levers can be rotated about the threaded shaft to tighten or release nut and so increase or decrease the clamp force.

4. As per paragraph 2 the bowl clamp device allowing the nut to rotate about the axis of the threaded shaft relative to the levers so the levers can be positioned at a particular orientation and the nut can be rotated about the threaded shaft separately from the levers to tighten or release nut and so increase or decrease the clamp force.

5. As per any of paragraphs 1 to 4, a bowl clamp device for use with a pan and tilt head that has a bowl on the underside, the bowl being designed to sit in a cup in a support, such as a tripod. The bowl clamp device being designed to fix to the pan and tilt head and provide a force to engage the bowl into the cup. The force being provided by springs and the clamp force being released by squeezing two or more levers together. Where at least one lever moves relative to the head and at least one lever is fixed relative to the head.

6. As per paragraph 5 the bowl clamp device including a nut where the clamp force can be adjusted by rotating the nut about a threaded shaft in order to vary the compression of the springs.

7. As per paragraph 6 the bowl clamp device not allowing the nut to rotate about the axis of the threaded shaft relative to the levers so the levers can be rotated about the threaded shaft to tighten or release nut and so increase or decrease the clamp force.

8. As per paragraph 6 the bowl clamp device allowing the nut to rotate about the axis of the threaded shaft relative to the levers so the levers can be positioned at a particular orientation and the nut can be rotated about the threaded shaft separately from the levers to tighten or release nut and so increase or decrease the clamp force.

9. A bowl clamp device as described in any proceeding of the claims that can be retrofitted to an existing pan and tilt head.

ADVANTAGES

The advantage of the current design is:

Allows the user to quickly release the clamping force that secures the head to the tripod, adjust the orientation of the head relative to the tripod to make the head level and reapply the clamping force to secure the head in this orientation. Making setup of pan and tilt heads quicker.

Provide controls that can are easy and ergonomic to access and operate for releasing the clamping force that secures the head to the tripod, adjust the orientation of the head relative to the tripod to make the head level and reapply the clamping force to secure the head in this orientation. Making setup of pan and tilt heads more easy.

Provides a long lever making fine changes in the orientation of the head relative to the tripod quicker and easier.

Clamp force can be increased or decreased as required by rotating the nut on the threaded shaft.

The system works with existing pan and tilt heads and tripods so can be retrofitted.

The invention claimed is:

1. A camera support bowl clamp device comprising:
a bowl member of a pan tilt head suitable for supporting one of a broadcast and a motion picture camera, wherein said bowl member is arranged within a recessed member of a camera support,
a shaft,
a clamping cup,
whereby said bowl member is attached at one end of said shaft and the clamping cup arranged at an opposite end of said shaft, whereby said opposite end extends through said recessed member of the camera support; wherein said clamping cup located at a first limit position applies a clamping force to a surface of said recessed member of the camera support which subsequently pulls said bowl member, via said shaft, down into said recessed member and applies a second clamping force from a surface of said bowl to a cooperating surface of said recessed member, and at a second limit position releases said clamping force exerted on said recessed member which subsequently releases said second clamping force by separating said surface of said bowl from said cooperating surface of said recessed member; wherein said clamping cup further comprises a clamp adjustment member;
wherein said clamping cup further comprises a resilient member, and at least one lever pivotally attached to said clamp adjustment member whereby the movement of said at least one lever to a first position compresses said resilient member to locate said clamping cup at said second limit position, and at a second position said at least one lever allows the resilient member to decompress to locate said clamping cup at said first limit position.

2. The clamp device according to claim 1, wherein said resilient member is a plurality of annular disc springs located about said clamp adjustment member.

3. The clamp device according to claim 2, wherein said clamp adjustment member further comprises a smooth outer surface which cooperates with an aperture of each said disc spring.

4. The clamp device according to claim 1, wherein said clamp adjustment member incorporates a flat face which cooperates with a slot within said at least one lever.

5. The clamp device according to claim 1, wherein said clamp adjustment member is a nut which comprises a threaded aperture that cooperates with a threaded portion on said shaft that, in use, facilitates positional adjustment of said nut on said shaft.

6. The clamp device according to claim 5, wherein the positional adjustment of said nut along said shaft towards said bowl member elevates both said resilient member and said clamping cup towards said bowl member.

7. The clamp device according to claim 5, wherein rotational adjustment of said clamp adjustment member by 'n' turns displaces said clamp adjustment member by a 'np' amount, whereby 'p' is a pitch of said threaded aperture, which in use compresses said resilient member by said amount 'np' which subsequently forces said clamp cup into a surface of said bowl member with a force 'f' which is equal to 'knp', whereby 'k' is a spring rate of said resilient member.

8. The clamp device according to claim 1, further comprising a second lever pivotally attached to said clamp adjustment member whereby the movement of said second lever to said first position compresses said resilient member to locate said clamp adjustment member at said second limit position, and at said second position said second lever decompresses said resilient member to locate said clamp adjustment member at said first limit position.

9. The clamp device according to claim 1, further comprising a second lever statically attached to said clamp adjustment member.

10. The clamp device according to claim 1, wherein said clamp adjustment member comprises an elongate adjustment member that extends along the same plane as said at least one lever.

11. The clamp device according to claim 1, wherein said clamp adjustment member comprises a disengaging/engaging mechanism for facilitating a positional adjustment of said clamp adjustment member further along said shaft.

12. A tripod comprising a camera support bowl clamp device, vice in accordance with claim 1.

* * * * *